March 5, 1957     K. R. GEISER     2,784,050
CURRENT AND FORCE MEASURING INSTRUMENT
FOR WELDING MACHINES
Filed Dec. 27, 1952     2 Sheets-Sheet 1

Inventor:
Kenneth R. Geiser,
by Paul A. Frank
His Attorney.

March 5, 1957

K. R. GEISER 2,784,050

CURRENT AND FORCE MEASURING INSTRUMENT
FOR WELDING MACHINES

Filed Dec. 27, 1952

Inventor:
Kenneth R. Geiser,
by Paul A. Frank
His Attorney.

United States Patent Office 2,784,050
Patented Mar. 5, 1957

2,784,050

CURRENT AND FORCE MEASURING INSTRUMENT FOR WELDING MACHINES

Kenneth R. Geiser, Schenectady, N. Y., assignor to General Electric Company, a corporation of New York Application December 27, 1952, Serial No. 328,232

5 Claims. (Cl. 346—49)

The present invention relates to a current-force measuring instrument.

More particularly, the invention relates to an instrument for measuring and recording the current flow and force variations arising in the welding electrode of an electric arc welder during a welding operation.

While there are a number of instruments of the above-mentioned type available in the electric welding industry, such instruments have not been entirely satisfactory for all purposes, and hence, have not been widely adopted. In particular, one known instrument which utilizes resistance strain gages and a current shunt to effect a current-force measurement, requires the use of a special electrode holder, and further, requires that the welding electrode supply circuit be broken for the purpose of insertion of the current shunt. These requirements are necessarily disadvantageous in that the results obtainable with the instrument are affected by the current shunt, hence, the shunt introduces an error in the measurement. Also, the instrument is difficult to operate, and is relatively expensive to manufacture. Further, the known instruments are comparatively bulky and cannot be conveniently transported to different sites where welding operations are being carried out.

It is, therefore, one object of the present invention to provide a new and improved current and force measuring instrument for electric arc welders which is capable of obtaining a simultaneous dynamic measurement of the current and force occurring in the welding electrode of such welders.

Another object of the invention is to provide an instrument of the above type which is portable, and completely self-contained requiring no external power source.

Still another object of the invention is to provide an instrument having the above characteristics of rugged, low-cost construction, and easily operated.

In practicing the invention, a current and force measuring device is provided which comprises a magnetic flux responsive means adapted to be mounted adjacent the welding electrode of an electric arc welder for producing a measurable indication of the current flow through such electrode during a welding operation, a force sensitive means adapted to be operatively mounted on the welding electrode for deriving a measurable indication of the forces arising in such electrode during the welding operation, and an indicator means responsive to both the flux responsive means and the force sensitive means for measuring the output indications derived thereby.

Other objects, features and many of the attendant advantages of this invention will be appreciated more readily as the same become better understood by reference to the following detailed description, when considered in connection with the accompanying drawings, wherein.

Figure 1:
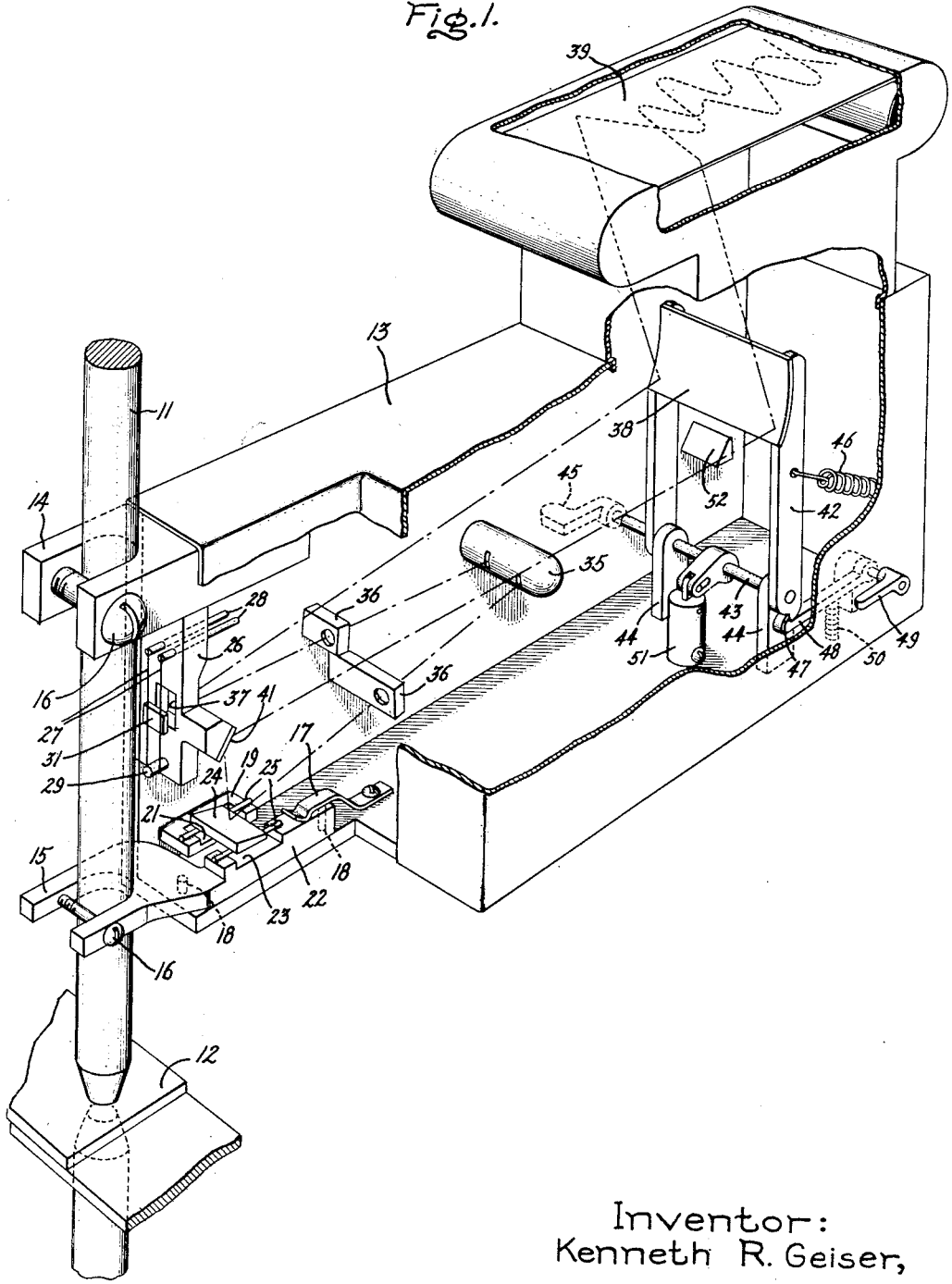
Fig. 1 is a perspective view of the current and force measuring instrument having the outer casing thereof partially broken away to facilitate observation of its construction.

Fig. 1 shows a current and force measuring and recording apparatus constructed in accordance with the present invention, which is mounted in operating relationship with respect to the welding electrode 11 of an electric arc welding machine being used to bond together two pieces of strip metal, or the like, shown at 12. The current and force measuring and recording apparatus is enclosed within a light-tight housing 13 supported on the welding electrode 11 by means of a pair of clamping members 14 and 15 that are rigidly secured to the welding electrode 11 by set screws 16. The clamping member 14 is fixed to housing 13 and serves to support the weight of the housing. The clamping member 15 is resiliently mounted on housing 13 by means of a spring member 17 and guide pins 18 which allow relative movement between clamping members 14 and 15, as well as movement between the clamping member 15 and the housing 13. The clamping members 14 and 15 together form an extensometer which further includes a support 19 that is secured to the side of housing 13, and has a depression 21 formed therein. The support 19 is disposed adjacent to and level with a raised support on extension 22 of the clamping member 15 in which a depression 23 is formed which is similar to the depression 21 in platform 19. A mirror element 24 is positioned over the depressions 21 and 23 by means of a pair of cross bars 25 so that upon relative movement occurring between clamping members 14 and 15, and hence, supports 19 and 22, the mirror element is allowed to rotate in one direction or another depending upon the direction of movement of the two platforms.

Figure 2:
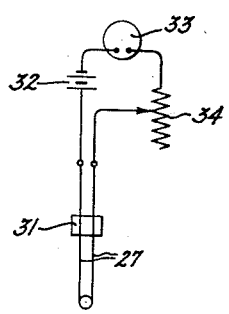
Fig. 2 is a wiring diagram of the energizing circuit for the current measuring element of the instrument shown in Fig. 1.
Figure 2A:
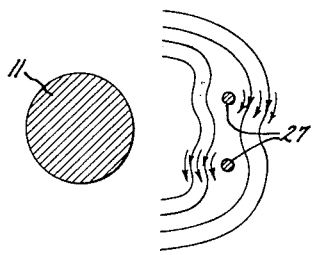
Fig. 2a is a plot of the magnetic flux adjacent an electrode.

Also attached to the housing 13 is a second supporting member 26 upon which a magnetic flux responsive means is secured. The magnetic flux responsive means comprises a two-wire armature 27 adapted to be supported in flux linking relationship with the welding electrode 11. The two-wire armature 27 comprises a section of electrically conductive wire secured in position on supporting member 26 by means of a pair of relatively rigid insulating posts 28 and a third post 29 about which the section of wire is looped so as to form a parallel, two-wire armature. Secured between the two wires of armature 27 is a mirror element 31 positioned so that upon the occurrence of relative movement between the two wires of the armature, mirror element 31 is rotated. The two-wire armature 27 is electrically connected in an energization circuit, best seen in Fig. 2 of the drawings, which further includes a source of electric potential such as a battery 32, a measuring instrument 33, if desired, and a variable resistor 34 for control purposes. The energization circuit causes electric current to flow through the two-wire armature 27, and results in the production of lines of electromagnetic flux linking the two wires of the armature. Upon current flowing through the electrode 11, the electromagnetic flux lines linking the surrounding electrode coact with the flux lines linking the two-wire armature 27 in the manner shown in Fig. 2a of the drawings to cause the wires to be moved relative to one another and thereby result in rotation of the mirror 31. Because the wires comprising armature 27 will be moved an amount depending upon the force resulting from the coaction, the flux linking the two wires is a function of the currents flowing through electrode 11 and through the two wires 27. As the current through the two wires 27 is held constant, mirror 31 will be rotated an amount depending upon the variations in current flow through the electrode 11, and the rotation of mirror 31 can be used to provide a measure of such current flow.

In order to measure the amount of movement of the mirrors 31 and 24, indicator means are provided which include a source of light 35, and optical means comprising focusing lens 36 for focusing light rays from the source of light 35 upon each of the mirrors 31 and 24. In order that the light beam from lens 36 be able to impinge on mirror 31, the supporting member 26 has a window 37 formed therein which allows the light rays from light source 35 to impinge upon, and be reflected from mirror 31. The light beam reflected from mirror 31 is directed toward a light beam focusing and reflecting means comprising an angularly movable, concave segment 38 of a cylindrical mirror which serves to focus the light beam reflected from mirror 31 upon a light sensitive surface 39, and to deflect the light beam across light sensitive surface 39. Light sensitive surface 39 may comprise the film of a Land polaroid camera, and is disposed on the top of housing 13 immediately over concave mirror 38.

Light rays from the mirror 24 are likewise caused to impinge upon concave mirror 38 by means of an additional angularly placed mirror 41 secured to the support 26 in a manner such that light rays reflected from mirror 24 impinge thereon, and are directed against concave mirror 38. Concave mirror 38 then causes the light rays to be reflected on to light sensitive member 39, and to be deflected across the light sensitive member at a predetermined time rate.

The light beam focusing and deflecting means comprised of the concave mirror 38 further includes a pivoted frame 42 which is fulcrumed on a rotatable shaft 43. Shaft 43 is journaled in a pair of upright supports 44 secured to the housing 13, and has a cocking lever 45 attached to one end thereof for cocking pivoted frame 42 and concave mirror 38 against the action of a biasing spring 46 attached to a free end of pivoted frame 42. Pivoted frame 42 also has a recess 47 formed in the pivoted end of one of the members thereof which defines a shoulder that coacts with a holding latch 48 having one end thereof hooked to complement the shoulder. Holding latch 48 has the other end thereof secured to a rotatable shaft in common with a release lever 49, and is biased upwardly into engagement with shoulder 47 by a compression spring 50. By this construction, the concave mirror 38 may be readily rotated to an upper or cocked position by the cocking lever 45, and maintained in this position against the action of biasing spring 46 by holding latch 48. Upon moving the release lever 49, holding latch 48 is disengaged from the shoulder 47 in pivoted frame 42, and the frame is rotated clockwise by the action of the biasing spring 46 to thereby cause the concave mirror 38 to angularly travel through a predetermined distance. In order to prevent the pivoted frame 42 from being slammed to its downward position during this action, a damping means such as a dash pot 51 is provided along with a back stop 52 having a padded surface.

In operation, the current and force measuring instrument is first positioned in operating relationship with the welding electrode of an electric arc welder in the manner shown. Thereafter, upon the electrode being pressed into engagement with the work 12, current flows through electrode 11, and a compressional force is developed in the electrode. Simultaneously with this action, the release lever 49 is actuated, and pivoted frame 42 rotated clockwise so as to move concave mirror 38 through its predetermined angular path. To accomplish this, the release lever 49 may be operated by an electric solenoid which is energized by the welding machine operation, or conversely, the release lever 49 may be provided with a pair of contacts, which, upon closing, serve to place the welding machine in operation.

The force arising in electrode 11 causes a section of the electrode intermediate the clamping members 14 and 15 to be compressed sufficiently so that finite relative movement will occur between each of the clamping members 14 and 15. The finite relative movement causes the mirror 24 to be rotated by an amount depending upon the compressional force existing in the electrode, and will cause the light beam reflected therefrom to be deflected by an amount determined by the magnitude of the compressional force. Concurrently with this action, the current flowing through the electrode produces an electromagnetic flux around the electrode which coacts with the flux lines produced around the two-wire armature 27 to cause the same to be rotated. Rotation of the armature 27 causes mirror 31 to deflect the light beam reflected therefrom an amount determined by the current flowing through electrode 11. Deflection of the mirrors 31 and 24 then causes the light beams reflected therefrom to the light beam focusing and deflecting concave mirror 38, to be traced across the surface of the light sensitive member 39 in a direction parallel to one of the coordinate axes of the member. Simultaneously with this action, concave mirror 38 is rotated by biasing spring 46 in the manner previously described to thereby cause deflection of the light beams in a direction parallel to the remaining coordinate axes, and hence transverse to the deflection due to movement of mirrors 24 and 31. This results in an expanded plot of the current and force light traces on light sensitive member 39 across some predetermined time basis, and makes the plot much easier to interpret.

Figure 3:
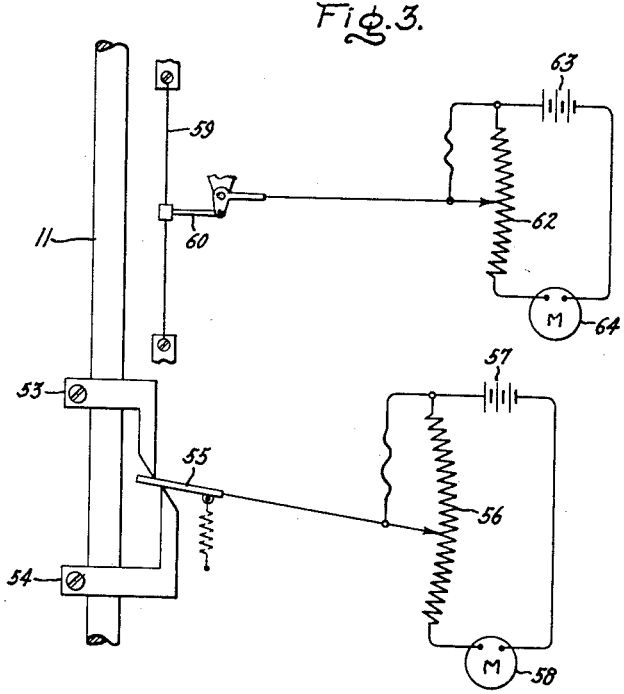
Fig. 3 is a fragmentary schematic view of a second embodiment of the invention.

An alternative to the construction of Fig. 1 is shown in Fig. 3 of the drawings wherein a portion of a welding electrode is shown at 11. Secured to the welding electrode 11 are a pair of clamping members 53 and 54 which are adapted to be rigidly attached to the welding electrode, and have extensions integral therewith which protrude inwardly toward each other. The adjacent ends of the integral extensions are attached to a pivoted lever arm 55 on opposite sides of the fulcrum thereof in a manner such that only a slight relative movement between the clamping members 53 and 54 causes the extensions to pivot the extended free end lever arm 55 in one direction or another depending upon the direction of movement of the clamping members. If the amount of amplification of the relative movement between clamping members 53 and 54 provided by the extended length of the free end of lever arm 55 is insufficient to properly actuate potentiometer 56, a mechanical movement amplification linkage, such as is used in the "Porter-Lipp" Strain Gage manufactured by the Baldwin Southwork Company, may be inserted in place of lever arm 55.

The free end of lever arm 55 is secured to the movable contact of a potentiometer including a variable resistor 56 and a source of electrical energy 57 so that movement of the lever arm 55 causes a variation in the resistance 56 and therefore results in a variation of the electric current flowing through the resistance. Included in electrical circuit relationship with the battery 57 and resistor 56 is an indicating instrument 58 of the moving galvanometer type which may be calibrated in terms of force so as to provide an indication of the amount of relative movement between the clamping arm members 53 and 54, and thereby provide an indication of the force occurring in the electrode member 11.

Also disposed adjacent the electrode 11 is a current carrying wire 59 which is tensioned between a pair of insulating supports secured to a housing, not shown, but which may be similar to the housing 13 shown in the embodiment of Fig. 1. Attached to the midpoint of the tensioned wire 59 is one end of a pivoted lever arm 60 having the extended free end thereof connected to the movable contact of a variable resistor 62. In view of the fact that conductor 59 has an electric current flowing therethrough, electromagnetic flux fields exist around the conductor which coact with the electromagnetic flux produced by the current flow through the electrode 11 to cause the tensioned conductor 59 to be vibrated or pushed to one side by an amount depending upon the value of the current flow through the electrode 11. Movement of the conductor 59 causes the lever 60 to be rotated by an amount depending upon the value of the current flow. Here again, if the amount of amplification of movement of conductor 59 provided by the extended length of the free end of a lever arm 55 is insufficient to properly actuate potentiometer 62, a mechanical movement amplification linkage such as is used in the "Porter-Lipp" Strain Gage manufactured by the Baldwin Southwork Company, may be inserted in place of lever arm 60. In any event, resistor 62 is varied by an amount indicative of the current value. Resistor 62 is included in a closed series electrical circuit with a source of electrical energy 63 and an indicating instrument 64 of the moving coil galvanometer type so that upon variation of resistor 62, meter 64 will provide an indication of such variation to thereby produce a measure of the current flowing through electrode 11. In closing, it should be pointed out that the present instrument is intended for use on alternating current welding machines, as well as on direct current machines. Hence, component parts, and particularly the moving elements of the instrument, must be constructed in a manner such that they have low inertia, and are capable of following dynamic variations due to the alternating character of the excitation potential.

From the foregoing description, it can be readily appreciated that the invention provides a new and improved current force measuring instrument for electric arc welders which is capable of obtaining a simultaneous measurement of current and force existing in the welding electrode of the welder. The instrument is of rugged and compact construction, and can be manufactured at at relatively low cost. Additionally, the compact construction of the instrument allows the same to be mounted in a portable housing so as to facilitate the use of the instrument in the field wherever it might by necessary to analyze the welding problems.

In the light of the foregoing teachings, other modifications and variations of the invention will be suggested to those skilled in the art. It is, therefore, to be understood that changes may be made herein which are within the full intended scope of the invention as defined by the appended claims.

What I claim as new and desire to secure by Letters Patent of the United States is:

1. A current and force measuring device for electric arc welders comprising a magnetic flux responsive moving coil armature having a mirror secured thereto, said armature being mountable adjacent the welding electrode of an electric arc welder for producing a measurable indication of the current flow through such electrode during a welding operation, force sensitive means comprising an extensometer having a pair of relatively movable clamping members adapted to be operatively secured to such welding electrode, a mirror secured to said clamping members for movement thereby to produce a measurable indication of the forces arising in such electrode during the welding operation, a light source, optical means for focusing the light rays from said light source on said mirrors, and recording means including a light sensitive member and a movable light beam focusing and deflecting means disposed in the paths of the light rays reflected from said mirrors for focusing the same on said light sensitive member and for deflecting the focused light beams across the light sensitive member in one direction at a predetermined time rate.

2. A recording device for recording the current flow through and the force arising in the electrode of an electric arc welder comprising a housing supportable on a welding electrode of an electric arc welder, a magnetic flux responsive moving coil armature mounted on said housing and disposed adjacent a welding electrode for producing a measurable movement indicative of the current flow through such electrode during the welding operation and a signal indicative of said measurable movement, force sensitive means supported by said housing and operatively secured to a welding electrode for deriving a measurable movement indicative of the compressional forces arising in such electrode during the welding operation and a signal indicative of said measurable movement, indicator means for producing indications of the movement of said flux responsive armature and said force sensitive means, and means for receiving said signals from said magnetic flux responsive moving coil armature and said force sensitive means and causing them to sweep said indicator means at a common predetermined time rate.

3. A current and force recording device for electric arc welders comprising a housing adapted to be supported on a welding electrode of an electric arc welder, a moving coil armature supported in said housing and adapted to be disposed adjacent said electrode, a first mirror element secured to said moving coil armature for movement therewith, an extensometer having a pair of relatively movable gripping members supported by said housing and adapted to be secured to the welding electrode, a second mirror element secured between the relatively movable gripping members of said extensometer and adapted to be moved thereby, a light source supported in said housing, optical means mounted adjacent said light source for directing the rays therefrom to said first and second mirror elements, a light sensitive recording member for producing records of the light rays traced thereacross, and light beam focusing and deflecting means disposed in the paths of the light rays reflected from said mirror elements for focusing the same on said light sensitive member and for deflecting the focused light beams across the light sensitive member at a predetermined time rate.

4. A current and force recording device for electric arc welders comprising a housing adapted to be supported on a welding electrode of an electric arc welder, a moving coil armature supported in said housing and adapted to be disposed adjacent said electrode, a first mirror element secured to said moving coil armature for movement therewith, an extensometer having a pair of relatively movable gripping members supported by said housing and adapted to be secured to the welding electrode, a second mirror element secured between the relatively movable gripping members of said extensometer and adapted to be moved thereby, a source of light supported in said housing, optical means mounted adjacent said point source of light for directing the rays therefrom to said first and second mirror elements, a light sensitive recording member for producing records of the light rays traced thereacross, a concave cylindrical mirror located to receive light from said first and second mirrors and to project and focus the light as a spot upon said light sensitive member, said first and second mirrors serving to deflect the light rays reflected therefrom in a direction parallel to a focal point lying in the optical plane of said concave mirror thereby to move the light spot projected from said mirror along one axis of said light sensitive member, and means to propel said concave mirror through an arcuate interval during a short period of time whereby the light reflected by said concave mirror is further projected along a coordinate axis of said light sensitive member.

5. In a welding apparatus employing a welding electrode and means to actuate said electrode to effect a welding operation, the combination of a light sensitive surface, a mirror, means to produce two beams of light, means associated with said electrode to deflect one of said beams of light to a position on said mirror corresponding to the current in said electrode and to deflect the other beam of light to a position on said mirror corresponding to stress in said electrode, said mirror being positioned to deflect both beams of light to said light sensitive surface, and means responsive to actuation of said welding electrode to deflect said mirror to cause said beams to produce respective traces across said light sensitive surface in fixed time relation during said welding operation whereby both stress and current in the electrode may be simultaneously and continuously traced on said light sensitive surface during a welding operation.

References Cited in the file of this patent

UNITED STATES PATENTS

| | | |
|---|---|---|
| 1,913,200 | Hathaway | June 6, 1933 |
| 2,267,356 | Ritzmann | Dec. 23, 1941 |
| 2,430,237 | Moncher | Nov. 4, 1947 |
| 2,613,127 | Geiser | Oct. 7, 1952 |
| 2,616,014 | Ellerly | Oct. 25, 1952 |

FOREIGN PATENTS

| | | |
|---|---|---|
| 359,822 | Great Britain | Oct. 29, 1931 |